(12) United States Patent
Saje et al.

(10) Patent No.: US 9,469,348 B2
(45) Date of Patent: Oct. 18, 2016

(54) DUAL FUNCTION ROCKER AND SEAT REINFORCEMENT

(71) Applicant: GM Global Technology Operations LLC, Detroit, MI (US)

(72) Inventors: Robert N. Saje, Shelby Township, MI (US); Robert M. Kielbik, Chesterfield Township, MI (US); Artur Wyszynski, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/287,648

(22) Filed: May 27, 2014

(65) Prior Publication Data

US 2015/0001882 A1    Jan. 1, 2015

Related U.S. Application Data

(60) Provisional application No. 61/840,766, filed on Jun. 28, 2013.

(51) Int. Cl.
| | |
|---|---|
| *B62D 25/20* | (2006.01) |
| *B62D 25/02* | (2006.01) |
| *B62D 65/00* | (2006.01) |
| *B62D 21/03* | (2006.01) |
| *B60N 2/015* | (2006.01) |

(52) U.S. Cl.
CPC .............. *B62D 25/025* (2013.01); *B60N 2/015* (2013.01); *B62D 21/03* (2013.01); *B62D 25/2036* (2013.01); *B62D 65/00* (2013.01); *Y10T 29/49622* (2015.01)

(58) Field of Classification Search
CPC .... B62D 21/02; B62D 21/03; B62D 21/157; B62D 25/025; B62D 25/20; B62D 25/2036

USPC .......... 296/187.08, 187.12, 193.02, 193.07, 296/203.03, 209

See application file for complete search history.

(56) References Cited

U.S. PATENT DOCUMENTS

| | | | | |
|---|---|---|---|---|
| 5,352,011 | A * | 10/1994 | Kihara et al. | ............ 296/203.03 |
| 5,820,204 | A * | 10/1998 | Masuda et al. | .......... 296/187.12 |
| 5,954,390 | A * | 9/1999 | Kleinhoffer et al. | .... 296/203.01 |
| 6,086,141 | A | 7/2000 | Masuda et al. | |
| 8,079,635 | B2 * | 12/2011 | DeVor et al. | ............ 296/187.08 |
| 2010/0109385 | A1* | 5/2010 | Yamada et al. | ............... 296/209 |
| 2012/0019026 | A1* | 1/2012 | Deng et al. | ............. 296/193.02 |
| 2012/0049501 | A1* | 3/2012 | Fujii et al. | .................... 280/806 |
| 2013/0195579 | A1* | 8/2013 | Freis | .......................... 411/387.1 |
| 2013/0257097 | A1* | 10/2013 | Kojo et al. | ............... 296/187.08 |

FOREIGN PATENT DOCUMENTS

| | | |
|---|---|---|
| CN | 101080577 A | 11/2007 |
| CN | 101722991 A | 6/2010 |
| CN | 102381366 A | 3/2012 |

OTHER PUBLICATIONS

Chinese Office Action dated Feb. 1, 2016 ; Application No. 201410295753.X ; Applicant: GM Global Technology Operations LLC. 7 pages.

* cited by examiner

*Primary Examiner* — Jason S Daniels
(74) *Attorney, Agent, or Firm* — BrooksGroup

(57) ABSTRACT

A number of variations may include a product including a vehicle rocker side reinforcement attached to an inboard face of the vehicle rocker. A number of variations may include a product including a vehicle rocker side reinforcement having a tipped surface. A number of variations may include a method comprising: attaching a rocker side reinforcement to a first wall of a rocker.

12 Claims, 5 Drawing Sheets

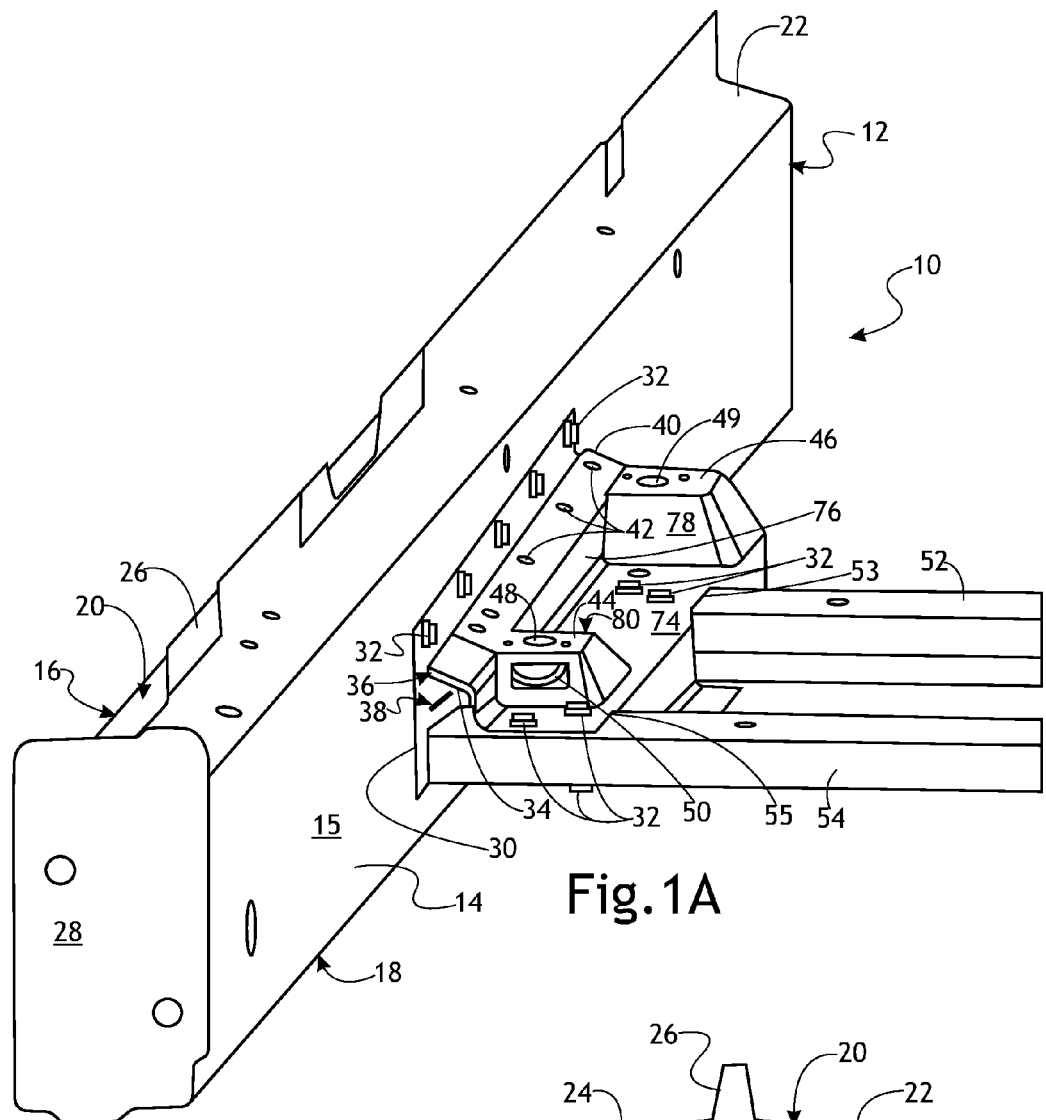
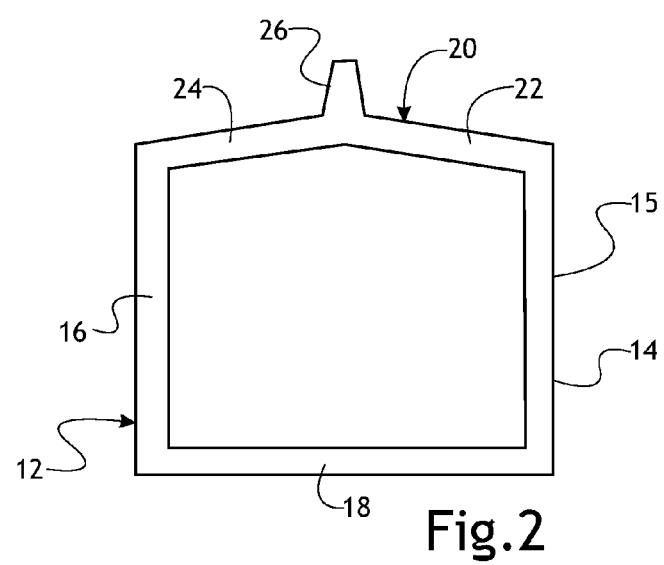

DUAL FUNCTION ROCKER AND SEAT REINFORCEMENT

CROSS-REFERENCE TO RELATED APPLICATIONS

This application claims the benefit of U.S. Provisional Application No. 61/840,766 filed Jun. 28, 2013.

TECHNICAL FIELD

The field to which the disclosure generally relates to includes vehicle rocker assemblies and methods of making and using the same.

BACKGROUND

Vehicles may be equipped with rockers.

SUMMARY OF ILLUSTRATIVE VARIATIONS

A number of variations may include a product including a vehicle rocker side reinforcement attached to an inboard face of the vehicle rocker.

A number of variations may include a product including a vehicle rocker side reinforcement having a tipped surface.

A number of variations may include a method comprising: attaching a rocker side reinforcement to a first wall of a rocker.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1A is a perspective view of a product including a vehicle rocker side reinforcement attached to an inboard face of a vehicle rocker according to a number of variations.

FIG. 2 is a sectional view of a vehicle rocker useful in a number of variations.

DETAILED DESCRIPTION OF ILLUSTRATIVE VARIATIONS

Figure 1B:
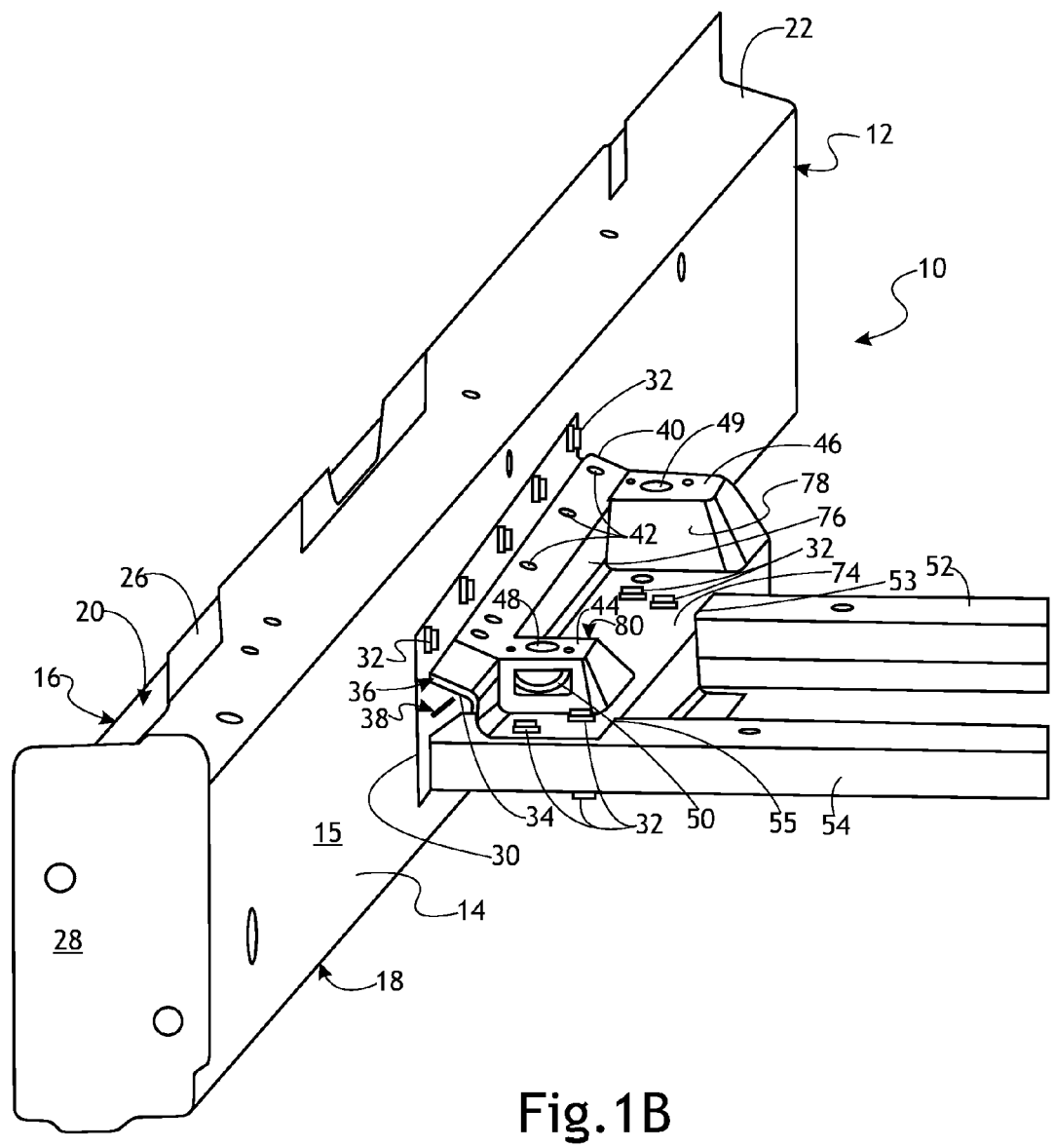
FIG. 1B is a perspective view of a product including a vehicle rocker side reinforcement attached to an inboard face of a vehicle rocker according to a number of variations.
Figure 3:
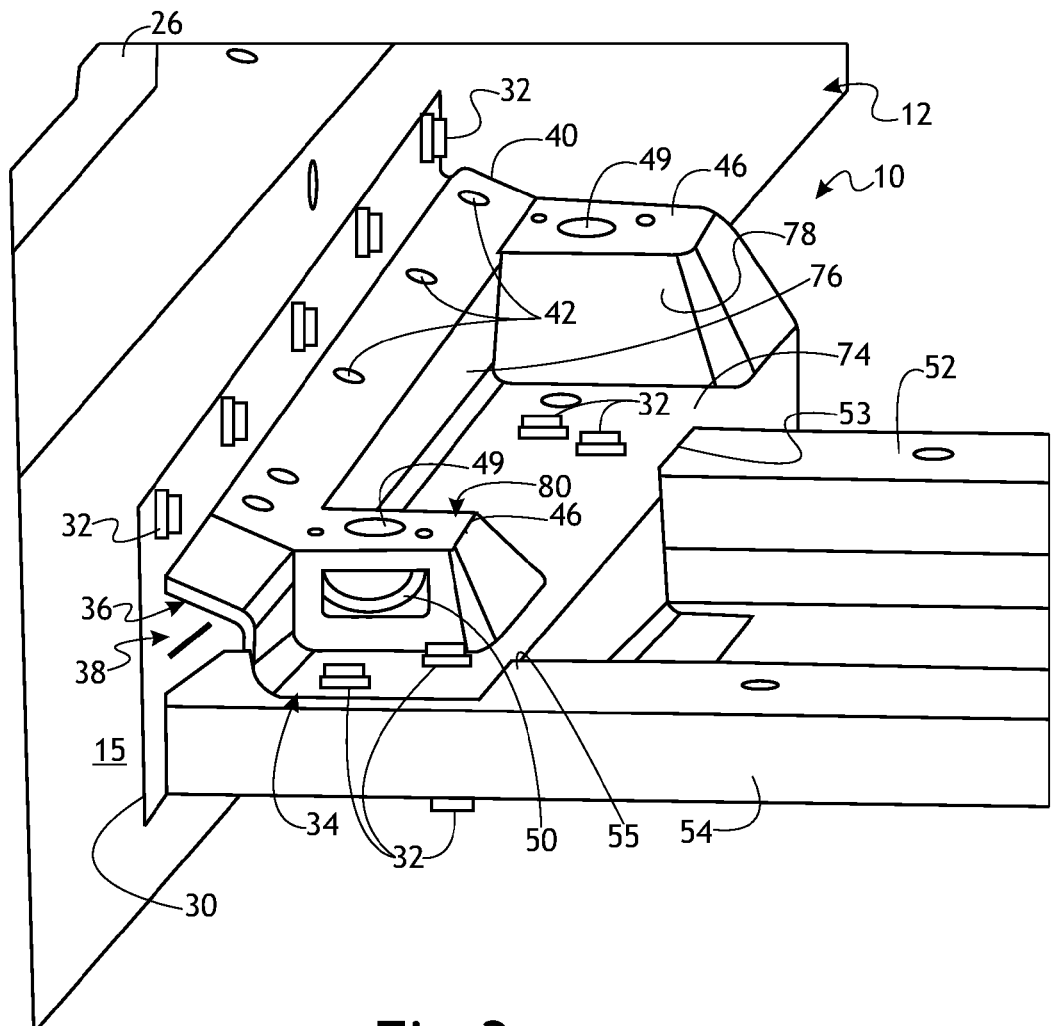
FIG. 3 is an enlarged perspective view of a product including a vehicle rocker side reinforcement attached to an inboard face of a vehicle rocker according to a number of variations.

The following description of the variations is merely illustrative in nature and is in no way intended to limit the scope of the invention, its application, or uses.

Referring now to FIGS. 1A-1B, 2 and 3, a number of variations may include a product including a vehicle rocker 12. The vehicle rocker may include a first wall 14 which may be an inboard wall, an opposite second wall 16, a bottom wall 18 and an opposite top wall 20. The top wall 20 may in a number of variations include a first segment 22 extending from the first wall 14 and a second segment 24 extending from the opposite second wall 16. In a number of variations, the first segment 22 and second segment 24 may be joined together to form an obtuse angle. If desired, a flange 26 may extend from the top wall 20 in a number of variations. An end plate 28 may be attached to an end of the vehicle rocker 12.

The vehicle rocker 12 may be made from a variety of materials. In a number of variations, the vehicle rocker 12 may be in an extrusion made from a variety of suitable materials including, but not limited to, an aluminum alloy.

In a number of variations, a rocker side reinforcement 30 may be attached to a first face 15 which may be an inboard face of the first wall 14. The rocker side reinforcement 30 may be constructed and arranged to, in a number of variations, provide improved side pole crashworthiness. In a number of variations, the rocker side reinforcement 30 may be made from a variety of materials including, but not limited to, steel and aluminum alloys. In a number of variations, the rocker side reinforcement 30 may be an extrusion and may be made from any of a number of suitable materials including, but not limited to, an aluminum alloy. In a number of variations, the rocker side reinforcement 30 may be an extruded aluminum alloy and may be attached to the rocker 12 by a plurality of mechanical fasteners 32 which may be flow drill screws which are driven through the rocker side reinforcement 30 and into the first wall 14 of the rocker 12. In a number of variations, the rocker side reinforcement 30 may include a pocket structure 36 defining a pocket 38 for receiving a shaft 62 and pointed end 64 of a mechanical fastener such as a flow drill screw.

In a number of variations, the product 10 may include a seat support 34 which is attached to the rocker side reinforcement 30. The seat support 34 may be made from a variety of materials including, but not limited to, steel or an extruded material such as an aluminum alloy. When the seat support 34 is made out of steel, a plurality of through-holes 42 may be formed in a flange 40 which may be constructed and arranged to overlap a portion of the pocket structure 36. Flow drill screws 32 may be inserted through the through-holes 42 and driven into the rocker side reinforcement 30. For an extruded seat support made from an aluminum alloy, the flange 40 may be provided without through-holes and a flow drill screw 32 may be driven through the flange 40 and into the rocker side reinforcement 30 so that a portion of the flow drill screw 32 is received and contained in the pocket 38. In a number of variations, the seat support 34 may include a first seat platform surface 44 having a through-hole 48 extending therethrough to provide access to a captured nut 50. A portion of a vehicle seat may be bolted to the seat support 34 via the captured nut 50. Similarly, a second seat platform surface 46 may be provided and may have a through-hole 49 formed therein for providing access to a captured nut (not shown). In a number of variations, the seat support 34 may include a base wall 74, a back wall 76, a first side wall 80 and an opposite second side wall 78. The first side wall 80 may be connected to the first seat platform surface 44 and the second side wall 78 may be connected to the second seat platform surface 46. The back wall 76 may be connected to the flange 40.

In a number of variations, a first lateral beam 52 may be provided and received in a recess 53 formed in the seat support 34. A second lateral beam 54 may be provided and may be received in a recess 55 formed in the seat support 34. The seat support 34 may include a lower lip 72 (best seen in FIG. 5). A plurality of mechanical fasteners 32 such as flow drill screws may be used to fasten the first lateral beam 52 and second lateral beam 54 to the seat support 34.

Figure 4:
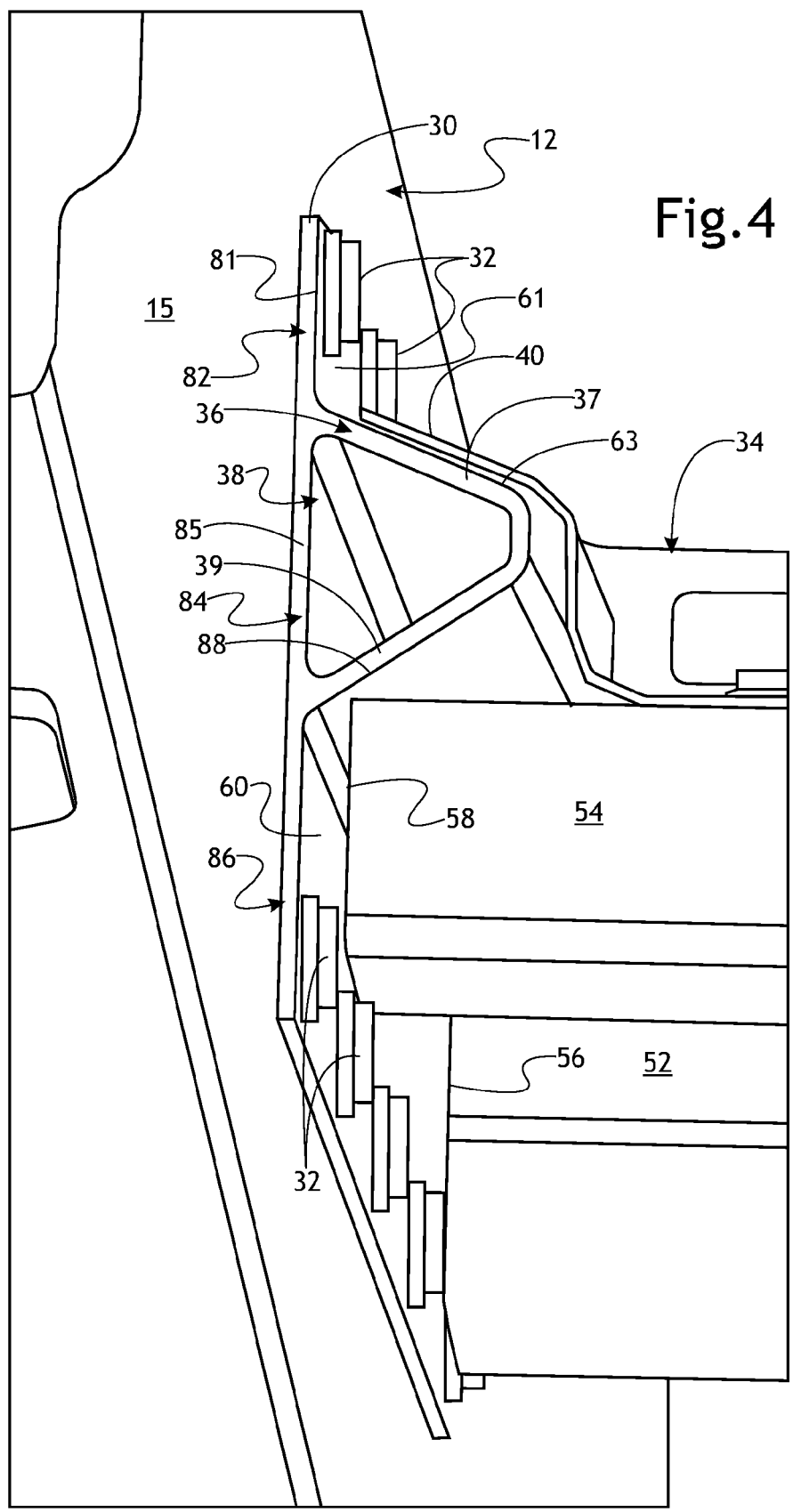
FIG. 4 is an enlarged perspective view looking upward of a product including a vehicle rocker side reinforcement attached to an inboard face of a vehicle rocker according to a number of variations.

Referring now to FIG. 4, in a number of variations, the rocker side reinforcement 30 may include a first section 82 which may have a planar wall having a planar face 61 on the inboard side of the rocker 12. The first section 82 may be connected to a second section 84 which may include the pocket structure 36 which may have a first side wall 37 having a planar surface 63 formed at an obtuse angle with respect to the planar surface 61 of the first section 82. A second side wall 39 may join the first side wall 37, and a base wall 85 joining both the first side wall 37 and second side wall 39. The pocket structure 36, in a number of variations, may have a triangular shape. The flange 40 of the seat support 34 may overlap the planar surface 63 of the first side wall 37 of the pocket structure 36. The rocker side reinforcement 30 may include a third section 86 connected to the second section 34. The third section 86 may include a planar wall having a planar surface 60. The first beam 52 may include an end 56 which engages the planar surface 60 of the third section 86. Similarly, the second lateral beam 54 may include an end 58 which engages the planar surface 60 of the third section 86 of the rocker side reinforcement 30. As such, the rocker side reinforcement 30 may act as a doubler to prevent penetration of the rocker 12 by the lateral beams 52 and 54.

Figure 5:
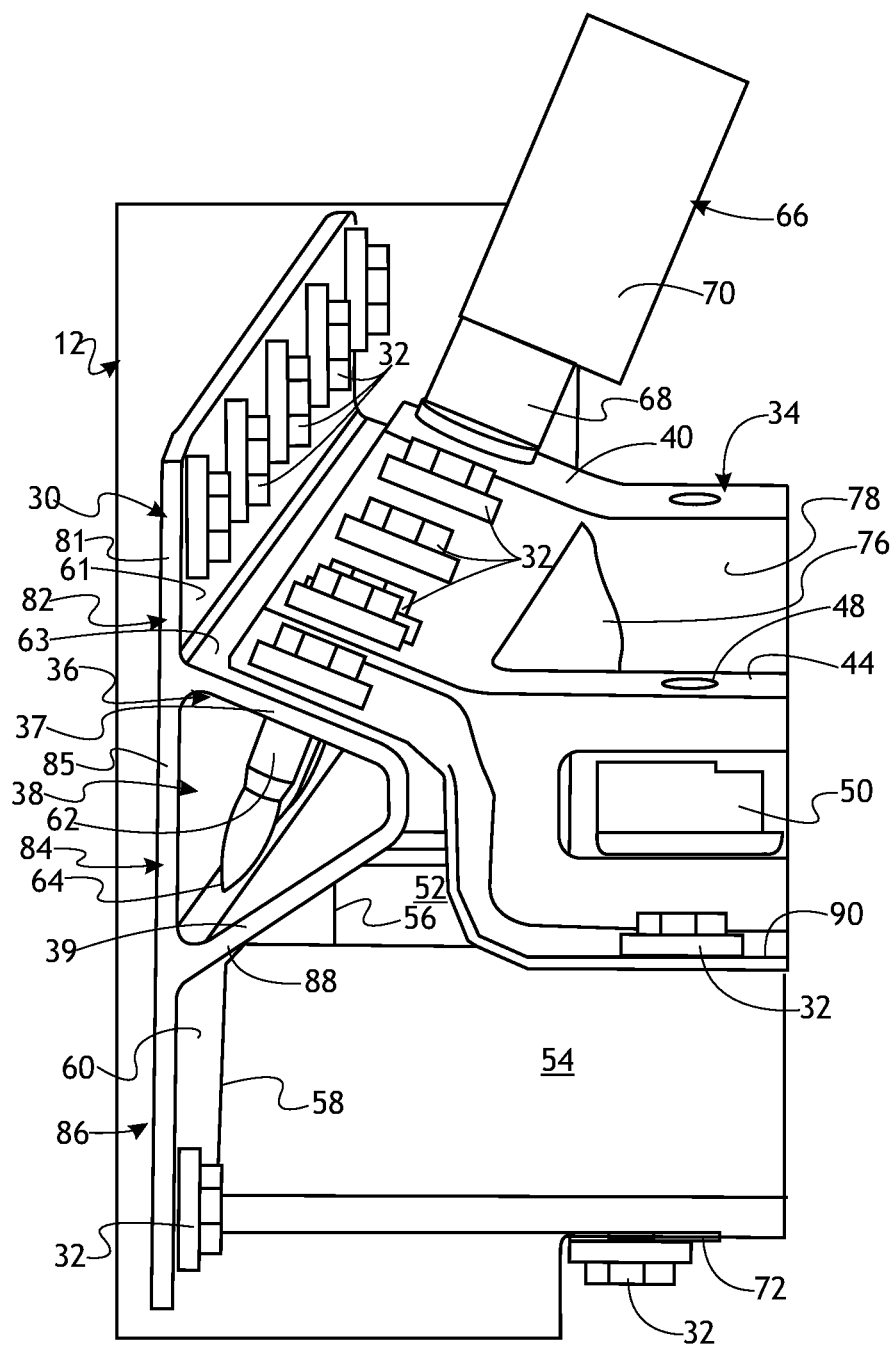
FIG. 5 is an enlarged perspective view of a portion of a product including a vehicle rocker side reinforcement attached to an inboard face of a vehicle rocker thereof according to a number of variations.

Referring now to FIG. 5, in a number of variations, a flow drill gun 66 may be utilized to drive flow drill screws 32 through the angled flange portion 40 of the seat support reinforcement 34 and into the tipped first wall 37 of the pocket structure 36 so that a shaft portion 62 and pointed end 64 of the flow drill screw 32 is received in the pocket 38 and captured so that the shaft 62 and pointed end 64 are not exposed to other components of the vehicle and so that the shaft 62 and pointed end 64 are not exposed in the occupant section of the vehicle. In a number of variations, at least a portion of the shaft 62 may be threaded if desired.

In a number of variations, the rocker 12 may be an extruded aluminum alloy wherein the first wall 14 has a thickness of 2 mm or greater.

In a number of variations, the rocker side reinforcement 30 may be an extrusion including a first section 82 having a thickness of 2 mm or greater. The second section 84 of the rocker side reinforcement 30 may have a first wall 37 having a thickness of 2 mm or greater. Similarly, the lower section 86 of the rocker side reinforcement 30 may have a thickness of 2 mm or greater. If desired, the pocket structure 36 may not have a base wall 85 or the second leg 39, or the base wall 85 and the second wall 39 may be thinner, having a thickness less than 2 mm, for example, 1.5 mm-1.99 mm.

The seat support 34 may be made from a material in which a flow drill screw 32 may be driven through, for example, but not limited to, an aluminum alloy. Portions of the seat support 34 through which a flow drill screw 32 is inserted may have a thickness of 2 mm or greater. For example, the flange 40, base wall 74, lower lip 72, and upper lip 90, may each have a thickness of 2 mm or greater.

In a number of variations, the rocker side reinforcement 30 may include a tipped surface 63. In one variation, the rocker side reinforcement 30 may include a first section 82 having a first wall 81 with a planar surface 61, and a second section 84 which may include a first planar wall 37 having a planar surface 63 which is tipped at an obtuse angle with respect to the planar face 61.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: a vehicle rocker having a first wall, and a rocker side reinforcement attached to the first wall.

Variation 2 may include a product as set forth in Variation 1 wherein the rocker side reinforcement comprises an extrusion.

Variation 3 may include a product as set forth in any of Variations 1-2 further comprising a seat support attached to the rocker side reinforcement.

Variation 4 may include a product as set forth in any of Variations 1-3 further comprising a first lateral beam attached to the seat support.

Variation 5 may include a product as set forth in Variation 4 further comprising a first lateral beam attached to the seat support.

Variation 6 may include a product as set forth in Variation 5 wherein the first lateral beam has an end engaging the rocker side reinforcement, and wherein the rocker side reinforcement is constructed and arranged to prevent the end of the first lateral beam from penetrating the first wall of the rocker.

Variation 7 may include a product as set forth in any of Variations 1-6 wherein the rocker side reinforcement includes a first planar wall and a second planar wall, the first planar wall and second planar wall forming an obtuse angle.

Variation 8 may include a product as set forth in any of Variations 1-7 wherein the rocker side reinforcement includes a pocket structure defining a pocket.

Variation 9 may include a product as set forth in Variation 4 wherein the seat support includes a flange, and wherein the rocker side reinforcement includes a first planar wall and a second planar wall, the first planar wall and second planar wall forming an obtuse angle, the flange attached to the second planar wall of the rocker side reinforcement.

Variation 10 may include a product as set forth in Variation 9 further comprising a plurality of flow drill screws extending through the flange and the second planar wall of the rocker side reinforcement.

Variation 11 may include a product as set forth in any of Variations 1-10 wherein the rocker side reinforcement includes a first section including a planar face; a second section including first wall having a planar surface, a second wall connected to the first wall and a base wall connected to the second wall; and a third section including a planar wall connected to the second section.

Variation 12 may include a product as set forth in any of Variations 1-11 wherein the rocker side reinforcement includes a triangular pocket for receiving a shaft and pointed end of a flow drill screw.

Variation 13 may include a method comprising: attaching a rocker side reinforcement to a first wall of a rocker.

Variation 14 may include a method as set forth in Variation 13 wherein the rocker is an extrusion.

Variation 15 may include a method as set forth in any of Variations 13-14 wherein the rocker side reinforcement is an extrusion.

Variation 16 may include a method as set forth in any of Variations 13-16 wherein the rocker side reinforcement includes a first planar wall and a second planar wall, the first planar wall and second planar wall forming an obtuse angle.

Variation 17 may include a method as set forth in Variation 16 wherein the attaching a rocker side reinforcement to a first wall of a rocker comprises driving plurality of a flow drill screws through the first wall of the rocker side reinforcement and into the first wall of the rocker.

Variation 18 may include a method as set forth in Variation 17 further comprising providing a set support having an angled flanged and using a flow drill gun to drive a plurality of flow drill screws through the angled flange and into the second wall of the rocker side reinforcement, wherein the angled flange and the second wall of the rocker side reinforcement are constructed and arranged to prevent the flow drill gun from engaging the first wall of the rocker side reinforcement or the first wall of the rocker during driving a flow drive screw.

Variation 19 may include a method as set forth in Variation 18 further comprising attaching a first lateral beam to the seat support.

Variation 20 may include a method as set forth in Variation 19 wherein the first lateral beam has an end engaging the rocker side reinforcement to prevent the end of the first lateral beam from penetrating the first wall of the rocker.

Variation 21 may include a comprising: a rocker side reinforcement comprising an extrusion having a pocket for receiving a portion of a shaft and a pointed end of a fastener.

The above description of select variations within the scope of the invention is merely illustrative in nature and, thus, variations or variants thereof are not to be regarded as a departure from the spirit and scope of the invention.

What is claimed is:

1. A product comprising:
a vehicle rocker having a first wall, and a rocker side reinforcement attached to the first wall, a seat support defining at least one recess attached to the rocker side reinforcement, a first lateral beam attached and received by the at least one recess and a second lateral beam attached to and received by the at least one recess and wherein the seat support includes a flange, and wherein the rocker side reinforcement includes a first planar wall and a second planar wall, the first planar wall and second planar wall forming an obtuse angle, the flange attached to the second planar wall of the rocker side reinforcement and a plurality of flow drill screws extending through the flange and the second planar wall of the rocker side reinforcement, wherein the first planar wall, the second planar wall and the obtuse angle, and the flange are constructed and arranged to prevent the flow drill gun from engaging the first planar wall of the rocker side reinforcement or the first planar wall of the rocker during driving a flow drive screw.

2. A product as set forth in claim 1 wherein the rocker side reinforcement comprises an extrusion.

3. A product as set forth in claim 1 wherein the first lateral beam has an end engaging the rocker side reinforcement, and wherein the rocker side reinforcement is constructed and arranged to prevent the end of the first lateral beam from penetrating the first wall of the rocker.

4. A product as set forth in claim 1 wherein the rocker side reinforcement includes a pocket structure defining a pocket.

5. A product as set forth in claim 1 wherein the rocker side reinforcement includes a first section including a planar face; a second section including first wall having a planar surface, a second wall connected to the first wall and a base wall connected to the second wall; and a third section including a planar wall connected to the second section.

6. A product as set forth in claim 1 wherein the rocker side reinforcement includes a triangular pocket for receiving a shaft and pointed end of a flow drill screw.

7. A method comprising:
attaching a rocker side reinforcement comprising a seat support defining at least one recess to a first wall of a rocker wherein the rocker side reinforcement includes a first planar wall and a second planar wall, the first planar wall and second planar wall forming an obtuse angle wherein the attaching a rocker side reinforcement to a first wall of a rocker comprises driving plurality of a flow drill screws through the first wall of the rocker side reinforcement and into the first wall of the rocker, further comprising providing a seat support having an angled flanged and using a flow drill gun to drive a plurality of flow drill screws through the angled flange and into the second wall of the rocker side reinforcement, wherein the angled flange and the second wall of the rocker side reinforcement are constructed and arranged to prevent the flow drill gun from engaging the first wall of the rocker side reinforcement or the first wall of the rocker during driving a flow drive screw.

8. A method as set forth in claim 7 wherein the rocker is an extrusion.

9. A method as set forth in claim 7 wherein the rocker side reinforcement is an extrusion.

10. A method as set forth in claim 7 further comprising attaching a first lateral beam to the seat support.

11. A method as set forth in claim 10 wherein the first lateral beam has an end engaging the rocker side reinforcement to prevent the end of the first lateral beam from penetrating the first wall of the rocker.

12. A product comprising:
a rocker side reinforcement comprising a seat support defining at least one recess and an extrusion having a pocket for receiving a portion of a shaft and a pointed end of a fastener, a first lateral beam disposed within the at least one recess and attached to the seat support and wherein the seat support includes a flange, and wherein the rocker side reinforcement includes a first planar wall and a second planar wall, the first planar wall and second planar wall forming an obtuse angle, the flange attached to the second planar wall of the rocker side reinforcement and a plurality of flow drill screws extending through the flange and the second planar wall of the rocker side reinforcement, wherein the first planar wall, the second planar wall, and the flange are constructed and arranged to prevent the flow drill gun from engaging the first planar wall of the rocker side reinforcement during driving the flow drive screws extending through the flange and the second planar wall of the rocker side reinforcement.

* * * * *